United States Patent
Roth et al.

(10) Patent No.: US 10,494,103 B2
(45) Date of Patent: Dec. 3, 2019

(54) EXPANDABLE AIRCRAFT MONUMENT, AND AIRCRAFT AREA HAVING AN EXPANDABLE AIRCRAFT MONUMENT

(71) Applicant: Airbus Operations GmbH, Hamburg (DE)

(72) Inventors: Ingo Roth, Hamburg (DE); Thomas Vogt, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 290 days.

(21) Appl. No.: 15/584,582

(22) Filed: May 2, 2017

(65) Prior Publication Data
US 2017/0320580 A1 Nov. 9, 2017

(30) Foreign Application Priority Data
May 3, 2016 (DE) .................... 10 2016 207 607

(51) Int. Cl.
*B64D 11/06* (2006.01)
*B64D 11/00* (2006.01)

(52) U.S. Cl.
CPC ...... *B64D 11/0691* (2014.12); *B64D 11/0007* (2013.01); *B64D 11/0602* (2014.12); *B64D 11/0627* (2014.12); *B64D 11/06* (2013.01); *B64D 11/0605* (2014.12); *B64D 2011/0046* (2013.01)

(58) Field of Classification Search
CPC . B64D 11/06; B64D 11/0602; B64D 11/0605; B64D 11/0627; B64D 11/0691; B64D 2011/0046
USPC .......................................... 244/188.5, 188.6
See application file for complete search history.

(56) References Cited

U.S. PATENT DOCUMENTS

| 6,007,025 A | 12/1999 | Coughren et al. |
| 6,079,669 A | 6/2000 | Hanay et al. |
| 9,650,144 B2 * | 5/2017 | Koyama ................ B64D 11/02 |
| 2006/0145442 A1 * | 7/2006 | Van Loon .............. A47B 51/00 280/79.7 |
| 2007/0034742 A1 * | 2/2007 | Jaeger .................... B64D 11/00 244/118.6 |

(Continued)

FOREIGN PATENT DOCUMENTS

| DE | 102011011704 A1 | 12/2012 |
| DE | 102013108121 A1 | 2/2015 |

(Continued)

OTHER PUBLICATIONS

German Search Report and English Translation, dated Feb. 16, 2017; priority document.

*Primary Examiner* — Bret Hayes
(74) *Attorney, Agent, or Firm* — Greer, Burns & Crain, Ltd.

(57) ABSTRACT

An aircraft monument for installation in an aircraft cabin. The aircraft monument comprises a movable side wall that is configured for separating the aircraft monument from a passenger area of the aircraft cabin, and that is configured for being moved. The aircraft monument further comprises at least one seat that is fastened to the movable side wall. Also disclosed is an aircraft area having a main aisle that extends along a longitudinal axis of an aircraft cabin, and having an aircraft monument situated next to the main aisle. Also disclosed is an aircraft that includes at least one aircraft area.

13 Claims, 4 Drawing Sheets

(56) References Cited

U.S. PATENT DOCUMENTS

| | | | |
|---|---|---|---|
| 2012/0248245 A1* | 10/2012 | Schliwa | ............... B61D 35/00 |
| | | | 244/118.5 |
| 2013/0001359 A1 | 1/2013 | Schliwa et al. | |
| 2013/0206906 A1 | 8/2013 | Burrows et al. | |
| 2015/0069179 A1 | 3/2015 | Ehlers et al. | |
| 2015/0266581 A1* | 9/2015 | Roese | ............... B64D 11/0015 |
| | | | 244/118.6 |
| 2015/0284082 A1 | 10/2015 | Mayer et al. | |
| 2015/0360782 A1 | 12/2015 | Jin et al. | |
| 2016/0167784 A1 | 6/2016 | Schliwa et al. | |

FOREIGN PATENT DOCUMENTS

| | | |
|---|---|---|
| DE | 102014110820 A1 | 2/2016 |
| EP | 2927125 | 10/2015 |
| EP | 2927125 A1 | 10/2015 |
| WO | 2014124987 | 8/2014 |
| WO | 2014124987 A1 | 8/2014 |

* cited by examiner

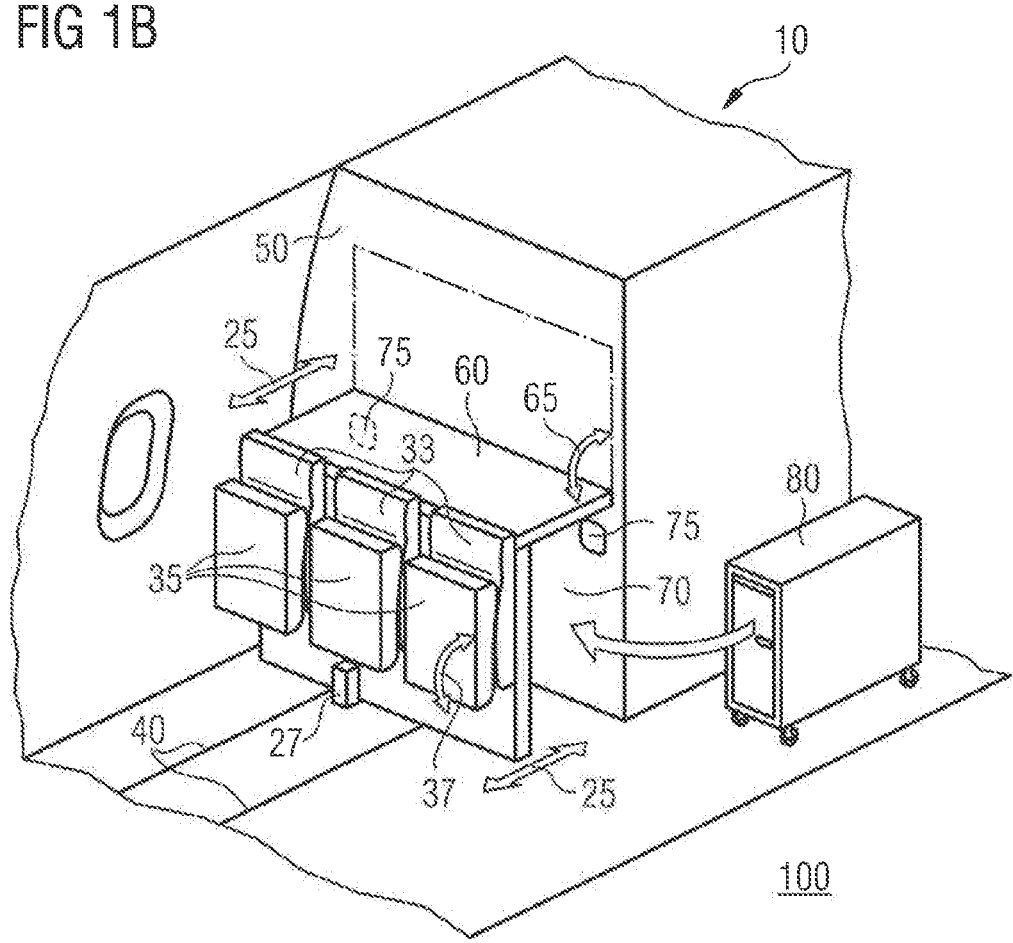

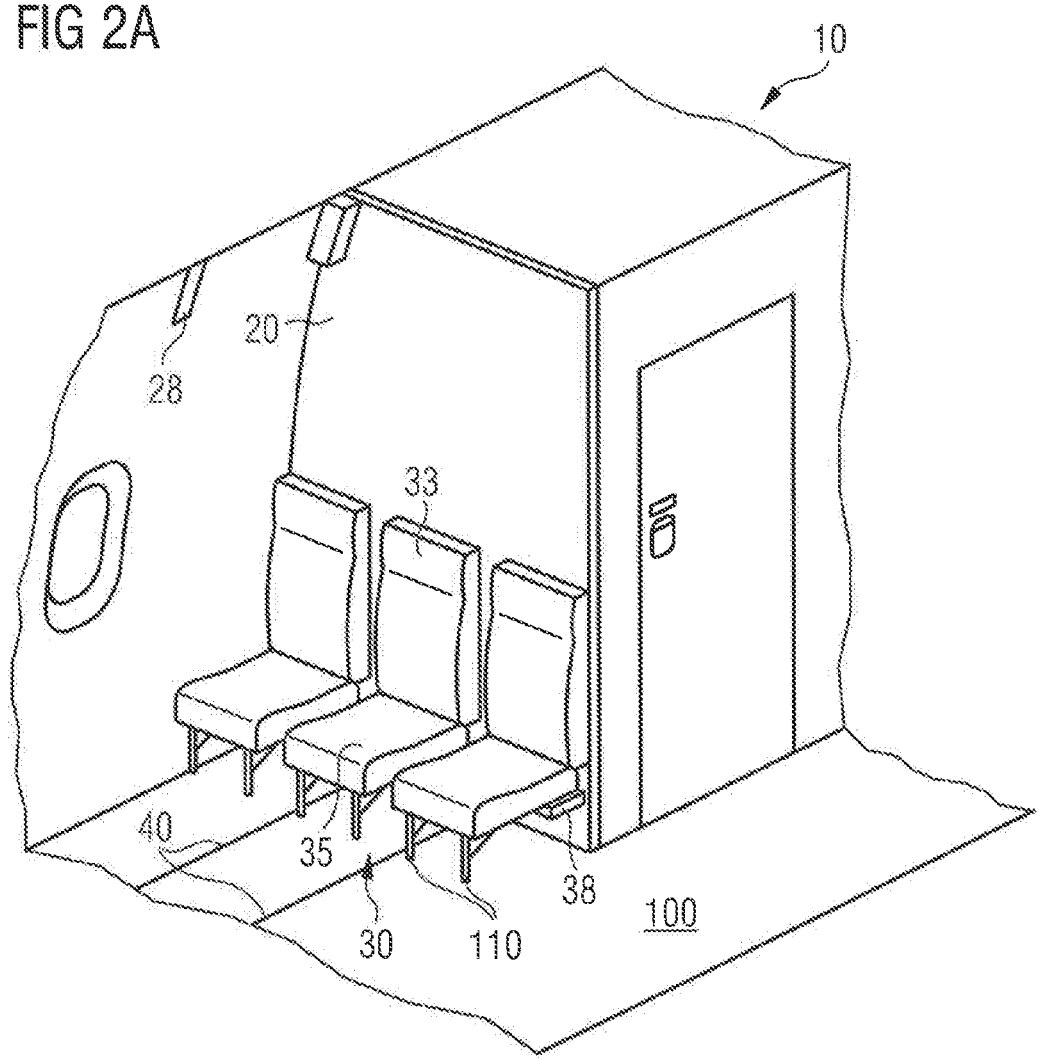

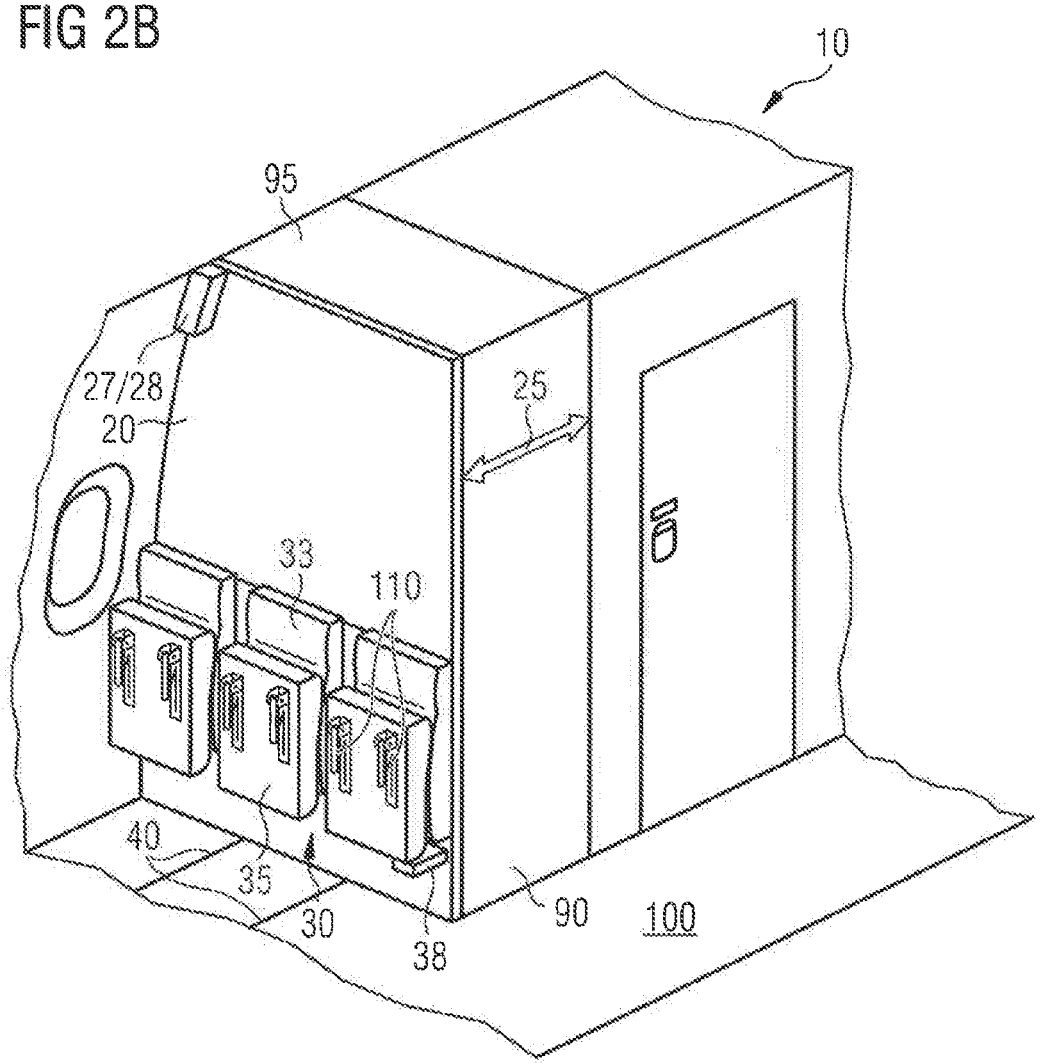

EXPANDABLE AIRCRAFT MONUMENT, AND AIRCRAFT AREA HAVING AN EXPANDABLE AIRCRAFT MONUMENT

CROSS-REFERENCES TO RELATED APPLICATIONS

This application claims the benefit of the German patent application No. 10 2016 207 607.8 filed on May 3, 2016, the entire disclosures of which are incorporated herein by way of reference.

BACKGROUND OF THE INVENTION

The present invention relates to an aircraft monument for installation in an aircraft cabin, an aircraft area that includes such an aircraft monument, and an aircraft having a corresponding aircraft area. In particular, the invention relates to an aircraft monument having a movable side wall and at least one seat that is fastened to the movable side wall, as well as an aircraft area having such an aircraft monument.

Commercial aircraft generally have at least one so-called aircraft monument. One example of such is a sanitary module with a sanitary facility. Another example of an aircraft monument is a galley, in which food and beverages for the passengers are stored, and prepared for serving to the passengers.

These aircraft monuments are often used for dividing the passenger cabin in the longitudinal direction of the aircraft. The arrangement of one or more aircraft monuments in the aircraft cabin determines the area in which seat rows can be mounted. The aircraft monuments usually close off the passenger area in the aircraft cabin, or a certain cabin class.

However, aircraft operators would like increasingly flexible options for using their aircraft. For example, a certain type of aircraft may operate short-haul flights, but is intended to also be usable for a medium-haul flight. On short-haul flights, preferably a large number of passengers are to be transported, for which no food or beverages are carried on board, whereas on medium-haul flights it is necessary to carry a certain quantity of food and beverages.

SUMMARY OF THE INVENTION

An object of the invention is to provide a flexible aircraft monument. A further object of the invention is to provide an aircraft area that is equipped with this type of aircraft monument, and a corresponding aircraft.

An aircraft monument that is provided for installation in an aircraft cabin includes a movable side wall that is configured for separating the aircraft monument from a passenger area of the aircraft cabin, and that is configured for being moved. The aircraft monument also includes at least one seat that is fastened to the movable side wall.

The movable side wall and the accompanying change in size of the aircraft monument allow the aircraft monument to be flexibly used, and at the same time, allow the size of the passenger area to be adapted according to the intended use of the aircraft. If a larger passenger area is desired on short-haul flights, for example, the movable side wall may be configured so that the aircraft monument takes up less space and enlarges the passenger area.

In addition, the seat may include a back element that is fastened to the movable side wall, and a seat element that is pivotable relative to the back element. The pivotable seat element may be pivoted between a seating position in which the seat element is essentially perpendicular to the back element, and a stowed position in which the seat element is essentially parallel to the back element.

By moving the side wall, it is thus possible to also move the seat fastened thereto. In addition, the space requirements for the seat may be greatly reduced by pivoting the seat element into the stowed position. The space thus obtained may be used for enlarging the aircraft monument. On the other hand, when the aircraft monument is reduced in size by appropriately moving the movable side wall, one or more additional seating accommodations for passengers may be provided by folding down (swiveling down) the seat element into the seating position. This is advantageous on short-haul flights, for example, since an entire additional seat row may be provided in the passenger area. On the other hand, if more space for the aircraft monument is necessary (for food and beverages, for example), as is often the case on medium-haul flights, this space may be obtained by simply moving the movable side wall.

In addition, the aircraft monument may include a locking mechanism that is configured for blocking movement of the movable side wall when the pivotable seat element of the seat is in the seating position. The side wall, with the seat fastened thereto, may thus be prevented from being pushed into the next seat row, thus damaging seats or other objects.

Alternatively or additionally, the aircraft monument may include a locking mechanism that is configured for blocking movement of the pivotable seat element when the movable side wall occupies a certain position. This prevents the seat element from folding down; otherwise, the seat element or a seat row situated in front of it could be damaged.

Alternatively or additionally, the aircraft monument may include a fixing device that is configured for fixing the movable side wall in at least two positions. The movable side wall in a first fixed position may specify a first size of an interior of the aircraft monument, and in a second fixed position may specify a second size of the interior of the aircraft monument that is larger than the first size. The first fixed position may be provided in such a way that the seat which is fastened to the movable side wall is at a sufficient distance from a seat situated in front of it. The seat element may thus be folded down to provide sufficient space for a passenger to sit.

In the second fixed position of the movable side wall, the movable side wall is moved farther into the passenger area than in the first fixed position. When the seat element is folded up (in the stowed position), it may thus rest practically against the next seat. In this way, the seating area may be utilized for the most part for enlarging the aircraft monument. Of course, the movable side wall may also be fixed in other fixed positions, depending on the needed space requirements for enlarging the aircraft monument. In addition, the second fixed position may also take into account that a seat back of an additional seat, in front of the seat element that is in the stowed position, may still be moved so as not to interfere with the comfort of the passenger sitting there.

In another embodiment, the fixing device may be configured for fixing the movable side wall in at least one seat rail of an aircraft floor. Such seat rails are typically mounted in the aircraft floor in the passenger area in order to secure seats or seat rows to the floor of the aircraft at certain distances from one another. Since the movable side wall is pushed into the passenger area, the seat rails that are already present may advantageously be used for securing the movable side wall. The fixing device may be similar to or the same as a fixing device that is customarily also used for the seats or seat rows for securing to a seat rail. The movable side wall may thus be manufactured in a particularly cost-effective manner.

Alternatively or additionally, the fixing device may be configured for fixing the movable side wall to at least one retaining device that is provided in a wall area and/or ceiling area of the passenger cabin. Particularly stable fixing of the movable side wall at multiple positions of the side wall may thus be achieved. Securing the movable side wall solely to a wall area and/or ceiling area of the passenger cabin is also conceivable. The movable side wall may thus be implemented in a "floating" manner, i.e., without support points and/or fastening means on the aircraft floor. This prevents damage or other impairment to the aircraft floor or components situated therein.

In another embodiment, the aircraft monument may also include a stationary side wall that is configured for at least partially spatially separating the interior of the aircraft monument from the passenger area of the aircraft cabin. Depending on the design of the aircraft monument, the stationary side wall may thus delimit a section of the aircraft monument, while the movable side wall may provide an additional room in the aircraft monument.

For example, in the first fixed position the movable side wall may be situated in a first plane that coincides with a plane in which the stationary side wall is situated, or at a first distance essentially parallel to the plane of the stationary side wall. In the second fixed position, the movable side wall may be situated in a second plane situated at a second distance, which is greater than the first distance, essentially parallel to the plane of the stationary side wall. Accordingly, in a side view of the aircraft monument in the installed state, the movable side wall may be situated below the stationary side wall when each of the two side walls constitutes only a partial area of the lateral delimitation of the aircraft monument. In other words, in a side view of the side walls, neither of the side walls has an overlapping area. In its first fixed position, the movable side wall may be situated in a plane that essentially corresponds to the plane of the stationary side wall. Otherwise, the movable side wall has an area that overlaps with the stationary side wall in the side view. The movable side wall is thus situated in a plane parallel to the plane of the stationary side wall, and thus is situated in front of the stationary side wall.

Alternatively or additionally, the aircraft monument may include a foldable cover element that is fastened at a first edge to the stationary side wall and rotatably supported. The foldable cover element may be configured to be situated essentially parallel to the stationary side wall in a stowed position. In addition, the cover element at its first edge may be affixed to the stationary side wall via hinges or other rotatable mountings. For the stowed position, holding means and/or closing means may also be provided which detachably couple a second edge of the cover element, opposite from the first edge, to the stationary side wall. Furthermore, the cover element in the stowed position may be situated, at least in part, in the stationary wall in order to occupy as little space as possible outside the aircraft monument.

In addition, the foldable cover element may be configured to be situated essentially perpendicular to the stationary side wall in a folded-down position, and at its second edge, opposite from the rotatably fastened edge, coupled to a top side of the movable side wall. Of course, the cover element may also be folded up to arrive at the position essentially perpendicular to the stationary side wall.

The foldable cover element may have a depth that corresponds to the length of the displacement of the movable side wall. The depth of the cover element is intended here to mean the distance with which the second edge of the foldable cover element protrudes from the stationary side wall in the folded-down state. The length of the displacement of the movable side wall means the distance of the plane of the movable side wall, when the movable side wall is in its second fixed position, from the plane when the movable side wall is in its first fixed position (for example, the plane of the stationary side wall). For this purpose, it is also advantageous when the movable side wall has a height that corresponds to the height of the second edge of the foldable cover element in its folded-down position.

Alternatively, the cover element may be situated on or in the movable side wall. The cover element here is rotatably coupled to the movable side wall, and may be moved from a stowed position into a position that is essentially perpendicular to the movable side wall and/or to the stationary side wall. In this case, the cover element is fastened to the stationary wall.

In any case, the movable side wall and the foldable cover element may be configured for forming a storage area in the second fixed position of the movable side wall and in the folded-down position of the foldable cover element. The movable side wall and the foldable cover element may be dimensioned in such a way that they form a storage area for accommodating at least one serving cart. Of course, the movable side wall and the foldable cover element may also form a larger or a smaller storage area.

In addition, retaining elements may be provided on the movable side wall, the stationary side wall, and/or the foldable cover element, by means of which shelves may be introduced into the storage area and fastened. For example, a storage area may thus be formed which may accommodate at least one serving cart, above which further storage compartments may be present.

Alternatively or additionally, retaining elements may be provided on the movable side wall, the stationary side wall, and/or the foldable cover element, to which doors or other closure elements for closing the storage area may be fastened. Thus, an opening that is formed when the movable side wall is in its second fixed position and the cover element is in the folded-down position may be closed, and objects may be secured in the storage area.

Likewise alternatively or additionally, the aircraft monument may include at least one cooling connection that is configured to be coupled to a cooling connection of a serving cart situated in the storage area. For example, serving carts may be accommodated in the storage area which have at least one opening through which the cooled air may be conducted into or out of the serving cart. In a further alternative or additional embodiment, the aircraft monument may include at least one cooling air opening that is configured for conducting cooled air into the storage area. The entire storage area and objects present therein, such as serving carts, may be cooled in this way.

The aircraft monument may include a galley. In this case, cooling devices are usually provided for the galley which may also be used for cooling the storage area or serving carts present therein.

In another embodiment option, the aircraft monument may include a sanitary module, for example having an aircraft toilet and/or washing facilities. The interior of the sanitary module may be enlarged by means of the movable side wall. For example, sanitary modules in aircraft must also be suitable for accommodating mobility-impaired persons. As a result, however, the sanitary modules always have a minimum size, even when no mobility-impaired person is on board. For the case that such a person is on board, the movable side wall may advantageously be moved in such a way that the interior of the sanitary module provides the required space.

In addition, the aircraft monument may include a side wall section that is essentially perpendicular to the movable side wall. Alternatively or additionally, the aircraft monument may include a ceiling section that is essentially perpendicular to the movable side wall and essentially perpendicular to the side wall section. The side wall section and/or the ceiling section may be fastened to the movable side wall, and may thus be moved together with the movable side wall. The side wall section and/or the ceiling section may be configured in such a way that they can be moved next to or in a further stationary side wall section or stationary ceiling section. A very compact extendable side wall or ceiling may be provided in this way.

According to another aspect of the present disclosure, an aircraft area is provided which includes a main aisle that extends along a longitudinal axis of an aircraft cabin. In addition, the aircraft area includes an aircraft monument, situated next to the main aisle, which has one of the embodiments described above or any given combination thereof.

Lastly, according to another aspect, an aircraft having at least one such aircraft area is provided.

BRIEF DESCRIPTION OF THE DRAWINGS

Preferred embodiments of the invention are explained in greater detail with reference to the appended schematic drawings, which show the following:

FIG. 1B shows a three-dimensional illustration of the aircraft from FIG. 1A in which a side wall of the aircraft monument is moved, FIG. 2A shows a three-dimensional illustration of an aircraft area in which a second variant of an aircraft monument is situated, and FIG. 2B shows a three-dimensional illustration of the aircraft area from FIG. 2A in which a side wall of the aircraft monument is moved.

DETAILED DESCRIPTION OF THE PREFERRED EMBODIMENTS

Figure 1A:
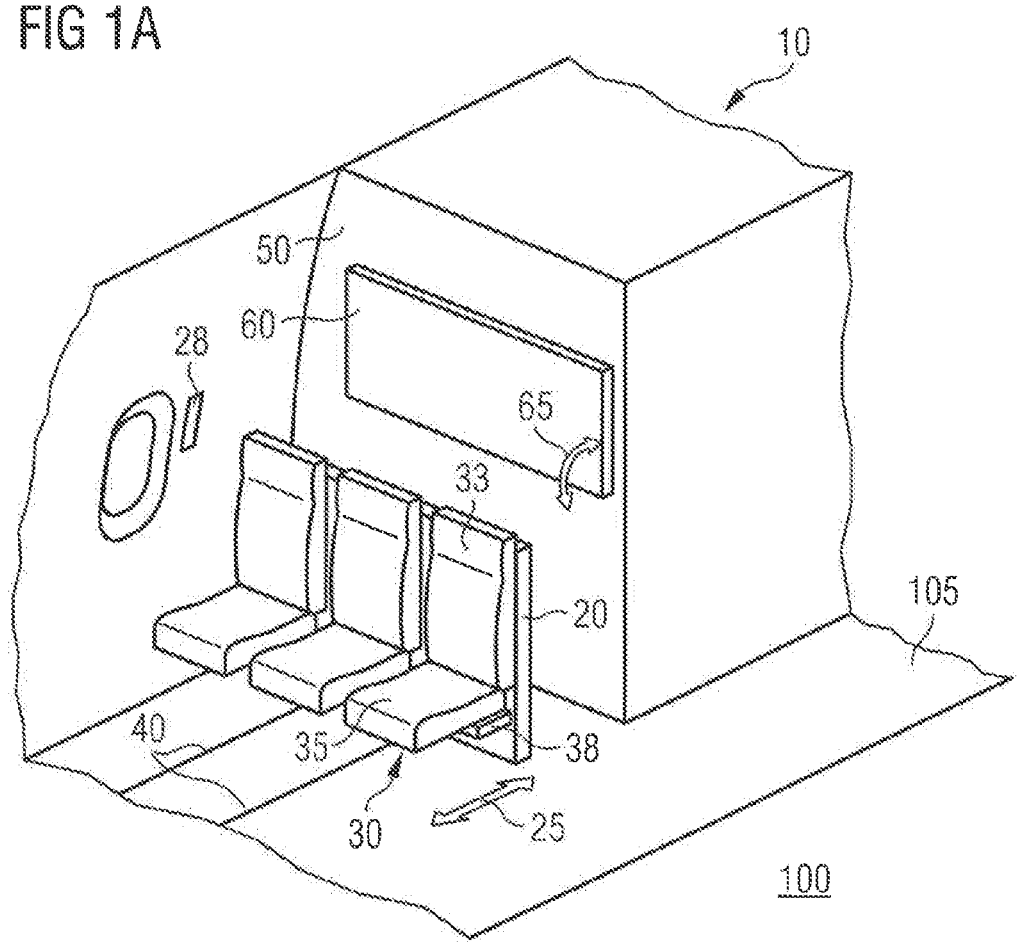
FIG. 1A shows a three-dimensional illustration of an aircraft area in which a first variant of an aircraft monument is situated.

FIGS. 1 and 2 show an aircraft area 100 that is formed by a portion of an aircraft cabin. An aircraft monument 10 is situated in the aircraft area 100. The interior of the aircraft monument 10 is defined by at least one side wall and optionally also by a ceiling element.

The aircraft area 100 may include a main aisle 105 that extends along a longitudinal axis of an aircraft cabin. The aircraft monument 10 may be situated next to this main aisle 105. A person may enter the aircraft monument 10 through a door to the main aisle 105. Alternatively, a door to a side corridor, which extends essentially perpendicularly with respect to the main aisle 105, may be provided. In another alternative, the aircraft monument 10 may be open on one side with no interior that can be walked through, as is the case for galleys, for example.

FIG. 1A shows a three-dimensional illustration of an aircraft area 100 in which a first variant of an aircraft monument 10 is situated. The aircraft monument 10 includes a movable side wall 20, for example. The movable side wall 20 may separate the aircraft monument from a passenger area of the aircraft cabin.

At least one seat 30 may be situated on the movable side wall 20. For example, a back element 33 of the seat 30 may be fastened to the movable side wall 20. The seat 30 also includes a seat element 35 that is pivotable relative to the back element 33. For this purpose, the seat element 35 may be fastened to, for example rotatably supported on, the movable side wall 20, the back element 33, and/or any given fastening element (not shown) that is situated on the movable side wall 20.

The pivotable seat element 35 is pivotable between a seating position and a stowed position. This movement of the seat element 35 is indicated by an arrow 37 in FIG. 1B. In the stowed position, the seat element is essentially parallel to the back element 33. For this purpose, the seat element 35, as shown in FIG. 1B, may be folded up (pivoted) in such a way that a seat surface of the seat element 35 faces toward a back surface of back element 33 and/or rests against same. In the seating position, the seat element 35 is essentially perpendicular to the back element. As shown in FIG. 1A, the folded-down (pivoted) seat element 35 together with the back element 33 forms a seat on which a passenger or a flight attendant may sit during the flight.

The side wall 20 may be moved as shown by the arrow 25. For example, the side wall 20 may be moved parallel to the main aisle 105 and thus, parallel to a longitudinal direction of the aircraft. Alternatively, the side wall may be moved in some other direction, for example perpendicular to the main aisle 105. An aircraft monument may thus be provided with a flight attendant seat on which a flight attendant sits, perpendicular to the main aisle 105. After the flight attendant seat has been used, the aircraft monument may be enlarged without affecting the space in the main aisle 105.

Furthermore, the present disclosure is not limited to the illustrated number of three seats 30. Of course, only a single seat 30 or any given number of seats 30 may also be situated on the movable side wall 20. If the movable side wall 20 extends parallel to the passenger seat rows situated in the aircraft, as many seats 30 may be situated on the movable side wall 20 as for a customary seat row.

The aircraft monument 10 may also include one or more locking mechanisms 38. For example, the locking mechanism 38 may block a movement of the movable side wall 20 due to the movement 37 of the seat element 35 in its seating position. The locking mechanism 38 may be designed in such a way that, in the seating position of the seat element 35 illustrated in FIG. 1A, it blocks movement of the side wall 20 by means of a lever mechanism. For example, the locking mechanism 38 may result in blocking of the side wall 20 on the floor in front of the movable side wall 20.

Alternatively or additionally, a locking mechanism 38 may be configured for blocking a movement of the pivotable seat element when the movable side wall 20 occupies a certain position. Thus, the seat element 35 in the folded-up (pivoted) stowed position may be blocked via the locking mechanism 38 (for example, a corresponding lever mechanism) when the movable side wall 20 is in the displaced position illustrated in FIG. 1B. The locking mechanism may thus prevent damage to the seat element 35 and/or the movable side wall 20, but may also prevent injury to persons due to inadvertently pivoting the seat element and/or moving the side wall 20.

In addition, the aircraft monument may include a fixing device 27 that is configured for fixing the movable side wall 20 in at least two positions. In a first fixed position, the movable side wall 20 may specify a first size of the aircraft monument 10. A corresponding first size of the aircraft monument 10 is illustrated in FIG. 1A. In this case the movable side wall 20 is situated closer to the (stationary) aircraft monument 10, so that the passenger area is larger, and provides space for folding down (pivoting) the seat surfaces 35. A second size of the interior of the aircraft monument 10, which is larger than the first size, may be specified by moving the side wall 20 to the position illustrated in FIG. 1B, and at that location fixing the movable side wall 20 in a second fixed position by means of the fixing device 27. Additional interior space for the aircraft monument 10 or an additional storage area 70 may be obtained in this way.

The fixing device 27 may be configured for fixing the movable side wall 20 in at least one seat rail 40 of an aircraft floor. For this purpose, the movable side wall 20 or the fixing device 27 may include elements that are customarily provided on mountings of passenger seats for securing in a seat rail 40. In this way, the movable side wall 20 may be moved and fixed in a simple manner that is familiar to personnel responsible for the conversion.

Alternatively or additionally, the fixing device 27 may be configured for fixing the movable side wall 20 to at least one retaining device 28 provided in a wall area and/or ceiling area of the passenger cabin. Similarly as for the fixing in the seat rail 40, the movable side wall 20 may be fastened using the alternative or additional retaining device 28 in the form of a rail. FIG. 1A shows, by way of example, a retaining device 28 situated in the wall area, which in FIG. 1B is concealed by the displaced side wall 20.

Furthermore, the aircraft monument 10 may also include a stationary side wall 50 that is configured for at least partially spatially separating the interior of the aircraft monument 10 from the passenger area of the aircraft cabin. The stationary side wall 50 may be smaller than, the same size as, or larger than the movable side wall 20. In addition, the movable side wall 20 in the first fixed position may be situated in a first plane. This first plane may coincide with a plane in which the stationary side wall 50 is situated. Alternatively, the first plane may be situated at a first distance from and essentially parallel to the plane of the stationary side wall 50. In the second fixed position, the movable side wall 20 may be situated in a second plane. The second plane is situated at a second distance, which is greater than the first distance, and likewise essentially parallel to the plane of the stationary side wall 50.

The movable side wall 20 in its first fixed position may thus be situated below or in front of the stationary side wall 50. In FIG. 1A, the movable side wall 20 is illustrated situated in front of the stationary side wall 50. Alternatively, the stationary side wall 50 has a recess or depression in which the movable side wall 20 is accommodated in its first fixed position. In the latter case, the movable side wall 20 is situated below the stationary side wall 50.

Similarly, the movable side wall 20 in its second fixed position may be situated essentially parallel to the stationary side wall 50 and at a distance therefrom. As shown in FIG. 1B, the movable side wall 20 has been moved in its displacement direction 25 away from the stationary side wall 50, and together with the stationary side wall 50 forms a storage area 70. Of course, the storage area 70 may also be formed by the stationary side wall 50 having an opening or depression on the surface area corresponding to the movable side wall 20. For example, the stationary side wall 50 may have a lower delimiting edge situated essentially at the same height, such as an upper edge of the movable side wall 20, so that the movable side wall 20 in its first fixed position may be situated below the stationary side wall 50, and in the second fixed position of the movable side wall 20 the stationary side wall 50 forms an opening in the interior of the aircraft monument 10. In this variant, objects may protrude from the interior of the aircraft monument into the storage area 70.

The aircraft monument 10 may optionally include a cover element 60 for forming the storage area 70. The cover element 60 may be fastened at a first edge to the stationary side wall 50 and be rotatably supported. In addition, the cover element 60 may be configured to be situated essentially parallel to the stationary side wall 50 in a stowed position. This stowed position of the cover element 60 is illustrated in FIG. 1A. Similarly, the foldable cover element 60 may also be configured to be folded down in a rotational direction 65, and in the folded-down position to be essentially perpendicular to the stationary side wall 50.

In addition, a second edge of the foldable cover element 60, opposite from the first edge, may be coupleable to the movable side wall 20 in the folded-down position of the foldable cover element 60. The foldable cover element 60 at the second edge may be coupled to a top side of the movable side wall 20. Of course, the foldable cover element 60 may also be coupled thereto at the side of the movable side wall 20. The cover element 60 separates the storage area 70 from the passenger space at the top, so that objects or the like cannot fall into the storage area 70.

Alternatively, the foldable cover element 60 at a first edge may be fastened to the movable side wall 20 and rotatably supported. In addition, the cover element 60 may be configured to be essentially parallel to the movable side wall 20 in a stowed position. In another alternative, the foldable cover element 60 may be stowed in the movable side wall 20. In this case, the foldable cover element 60 at a second edge is fastened to the stationary side wall 50.

In another alternative, the foldable cover element 60 may also be fastened to the movable side wall 20 or the stationary side wall 50 and rotatably supported in such a way that it must be folded up in order to form and close off the storage area 70.

Furthermore, the movable side wall 20 and the cover element 60 may be dimensioned and configured so that the storage area 70 which they create is suitable for accommodating at least one serving cart 80. For example, the width of the cover element 60 (width in the folded-down state) may be designed to be slightly larger than the standard width of a serving cart 80, so that the latter may be easily moved in and out of the storage area 70.

In addition, the aircraft monument 10 may include at least one cooling connection that is configured to be coupled to a cooling connection 75 of a serving cart 80 situated in the storage area 70. Certain types of serving carts have openings through which cooled air may be led into the interior of the serving cart 80. A cooling connection 75 in the storage area 70 may therefore be situated so that a serving cart 80 with its corresponding opening may be connected to the cooling connection 75.

Alternatively or additionally, at least one cooling air opening 75 may also be situated on the aircraft monument 10, the cooling air opening 75 being configured for conducting cooled air into the storage area 70. The entire interior of the storage area 70 may be cooled via this form of cooling. This is suitable for cooling serving carts 80 that do not have a corresponding opening for cooled air.

The variant shown in FIGS. 1A and 1B is suitable for aircraft monuments 10 that include a galley. The galley usually already contains cooling air lines and appropriate connections, so that the storage area 70 formed by the movable side wall 20 may be easily implemented for additional serving carts 80. Of course, the aircraft monument 10 may also be a cabinet or a sanitary module, or may be used for some other purpose.

Alternatively or additionally, the storage area 70 may be designed to be higher or wider, as illustrated in FIG. 1B. For example, the movable side wall 20 may be higher. This allows additional storage space on the cover element 60, for example for pillows, blankets, and other objects that are needed during the flight. In addition, a further cover element may also be provided so that a vertical division of the storage area 70 may be achieved. Of course, it is also possible to provide only a single cover element 60, which closes the storage area 70 at the top corresponding to an arbitrary height of the movable side wall 20. Likewise, one or more cover elements 60 may be implemented which may be vertically moved on the stationary side wall 50 in order to achieve a variable division of the storage area 70. For this purpose, the movable side wall 20 and/or the stationary side wall 50 may have retaining devices for the cover element(s) 60 at various heights.

Moreover, the storage area 70 may also include a door, which for reasons of clarity is not illustrated in the figures. This door may close an opening in the storage area 70 toward the main aisle 105, for example as shown in FIG. 1B. Objects such as serving carts 80, for example, situated in the storage area 70 may thus be secured from falling out.

In the variant illustrated in FIGS. 2A and 2B, the aircraft area 100 may include an aircraft monument 10 which is a sanitary module. The movable side wall 20 may have a height that corresponds to the height of the aircraft monument 10. Similarly as for the variant from FIGS. 1A and 1B, at least one seat 30, in particular a back element 33 and a pivotable seat element 35, is also fastened to the movable side wall 20.

The interior of the sanitary module 10 may be enlarged by moving the side wall 20. For this purpose, the aircraft monument 10 also has a side wall section 90 that is essentially perpendicular to the movable side wall 20. For example, the side wall section 90 is situated parallel to the main aisle 105. The side wall section 90 may be fastened to the movable side wall 20.

Additionally or alternatively, the aircraft monument 10 may have a ceiling section 95 that is essentially perpendicular to the movable side wall 20 and essentially perpendicular to the side wall section 90. Of course, the ceiling section 95 may also be situated at an angle with respect to the side wall section 90, for example for adaptation to a ceiling area of the aircraft cabin. In this case, the movable side wall 20 would also have a correspondingly angled top edge, along which the ceiling section is situated. The ceiling section 95 may be fastened to the movable side wall 20.

Furthermore, the side wall section 90 and/or the ceiling section 95 may be movably situated in a corresponding stationary side wall section or stationary ceiling section. The interior of the sanitary module 10 may be enlarged by moving the side wall 20, the interior of the sanitary module 10 still being completely separate from the passenger area. This is particularly advantageous when one or more persons are on board who require a larger sanitary module 10, for example mobility-impaired persons.

As illustrated in FIG. 2A, a retaining device 28 may be provided in a wall area, to/in which the movable side wall in its second fixed position is fastened. This may take place using the fixing device 27 shown in FIG. 2B.

FIGS. 2A and 2B also illustrate optional support mechanisms 110. One or more of the seats 30 may include such a support mechanism. The support mechanisms may be situated beneath the seat element 35 in order to support the seat element 35 in its seating position (folded-down position) on the floor. By use of such an articulated mechanism, when the seat element 35 is folded up (into the stowed position), the support mechanism 110 may likewise be folded up into a stowed position, and may be unfolded when the seat element 35 is folded down (into the seating position). In addition, the support mechanism 110 may be situated in the seat element 35 in such a way that it is at least partially stowed in the seat element 35 in the folded-up state.

The present disclosure is not limited to the variants illustrated in FIGS. 1 and 2. Of course, elements that are shown in only one of the illustrated variants and described in this regard may also be used and implemented in the other variant. For example, the support mechanism 110 may also be used in the variant of an aircraft monument 10 shown with reference to FIGS. 1A and 1B.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft monument for installation in an aircraft cabin, comprising:
   a movable side wall configured to separate the aircraft monument from a passenger area of the aircraft cabin;
   at least one seat fastened to the movable side wall,
   a stationary side wall configured to at least partially spatially separate an interior of the aircraft monument from the passenger area of the aircraft cabin,
   a foldable cover element fastened at a first edge to the stationary side wall or to the movable side wall and rotatably supported, wherein at least one of:
   the foldable cover element is configured to be situated essentially parallel to the stationary side wall in a stowed position, and in addition is configured to be situated essentially perpendicular to the stationary side wall in a folded-down position, or
   a second edge of the foldable cover element, opposite from the first edge, is coupleable to the movable side wall or to the stationary side wall.

2. The aircraft monument according to claim 1, wherein the at least one seat comprises:
   a back element that is fastened to the movable side wall; and
   a seat element that is pivotable relative to the back element,
   the pivotable seat element being pivotable between a seating position in which the seat element is essentially perpendicular to the back element, and a stowed position in which the seat element is essentially parallel to the back element.

3. The aircraft monument according to claim 2, further comprising at least one of:
- a locking mechanism configured to block a movement of the movable side wall when the pivotable seat element of the seat is in the seating position, or
- a locking mechanism configured to block a movement of the pivotable seat element when the movable side wall occupies a certain position.

4. The aircraft monument according to claim 1, further comprising:
- a fixing device configured to fix the movable side wall in at least two positions,
- wherein the movable side wall in a first fixed position defines a first size of the interior of the aircraft monument, and the movable side wall in a second fixed position defines a second size of the interior of the aircraft monument that is larger than the first size.

5. The aircraft monument according to claim 4, wherein the fixing device is configured to fix the movable side wall in at least one seat rail of an aircraft floor.

6. The aircraft monument according to claim 4, wherein the fixing device is configured to fix the movable side wall to at least one retaining device that is provided in at least one of a wall area or ceiling area of the passenger area.

7. The aircraft monument according to claim 4, wherein in the first fixed position, the movable side wall is situated in a first plane that coincides with a plane in which the stationary side wall is situated, wherein the movable side wall is situated at a first distance essentially parallel to or coincident with the plane of the stationary side wall, and wherein in the second fixed position, the movable side wall is situated in a second plane situated at a second distance, which is greater than the first distance, essentially parallel to the plane of the stationary side wall.

8. The aircraft monument according to claim 4, wherein the movable side wall and the foldable cover element, in the second fixed position of the movable side wall and in the folded-down position of the foldable cover element, are configured to form a storage area for accommodating at least one serving cart.

9. The aircraft monument according to claim 8, further comprising at least one of:
- at least one cooling connection configured to be coupled to a cooling connection of a serving cart situated in the storage area, or
- at least one cooling air opening configured for conducting cooled air into the storage area.

10. The aircraft monument according to claim 1, wherein the aircraft monument is a sanitary module.

11. The aircraft monument according to claim 1, further comprising at least one of:
- a side wall section that is essentially perpendicular to the movable side wall; or
- a ceiling section essentially perpendicular to the movable side wall and essentially perpendicular to the side wall section,
- wherein the at least one of the side wall section or the ceiling section is fastened to the movable side wall.

12. An aircraft area, comprising:
- a main aisle that extends along a longitudinal axis of an aircraft cabin; and
- an aircraft monument according to claim 1 situated next to the main aisle.

13. An aircraft that includes at least one aircraft area according to claim 12.

* * * * *